United States Patent [19]

Grabast

[11] 3,845,980
[45] Nov. 5, 1974

[54] MOBILE TRAILER GARAGE WITH CONVERTIBLE FURNISHINGS

[76] Inventor: Edwin F. Grabast, Rt. 2, Box 61, Bozeman, Mont. 59715

[22] Filed: Feb. 12, 1973

[21] Appl. No.: 331,831

[52] U.S. Cl..................... 296/23 R, 214/500, 5/2 R
[51] Int. Cl............................................. B60p 3/34
[58] Field of Search........ 296/23 R, 24 R, 1 A, 1 R; 214/50 Q; 5/2 R, 10 B, 233, 259

[56] References Cited
UNITED STATES PATENTS

| | | | |
|---|---|---|---|
| 2,942,744 | 6/1960 | Hall | 214/500 |
| 3,193,321 | 7/1965 | Rose | 296/23 R |
| 3,567,272 | 3/1971 | Low | 296/23 R |

*Primary Examiner*—Philip Goodman

[57] ABSTRACT

In the disclosed trailer, the storage or garage space contains convertible furnishings that can be moved from a folded, stored position under the trailer ceiling to an unfolded (utility) position. The stored position allows room to store a vehicle or the like in the trailer. The convertible furnishings include a bed-table combination having an elongated rectangular board pivotally suspended from the ceiling. The lower half of the elongated board acts as a headboard for the bed in the unfolded position and, in this position, the entire board serves as a room divider or partition means.

10 Claims, 4 Drawing Figures

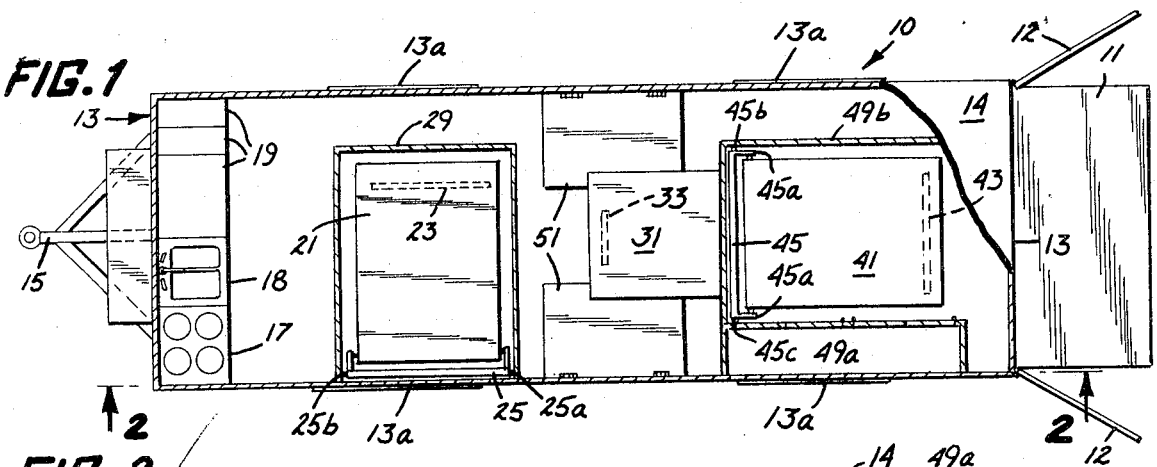
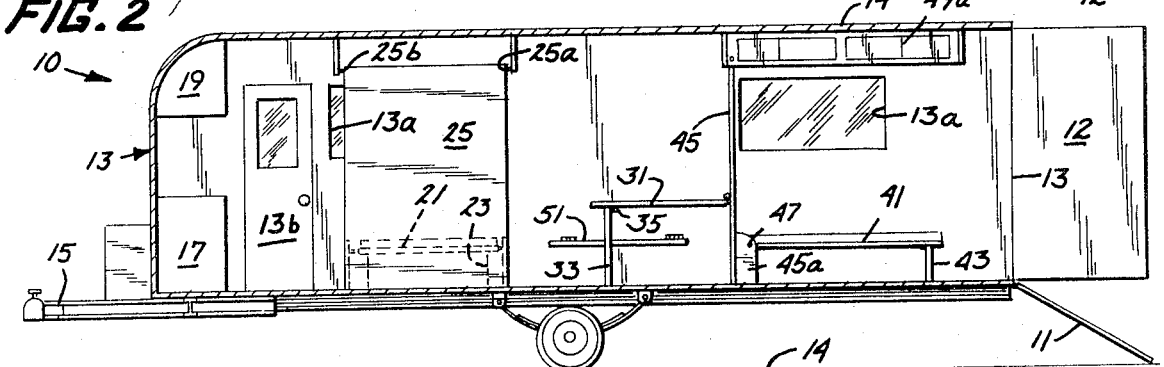
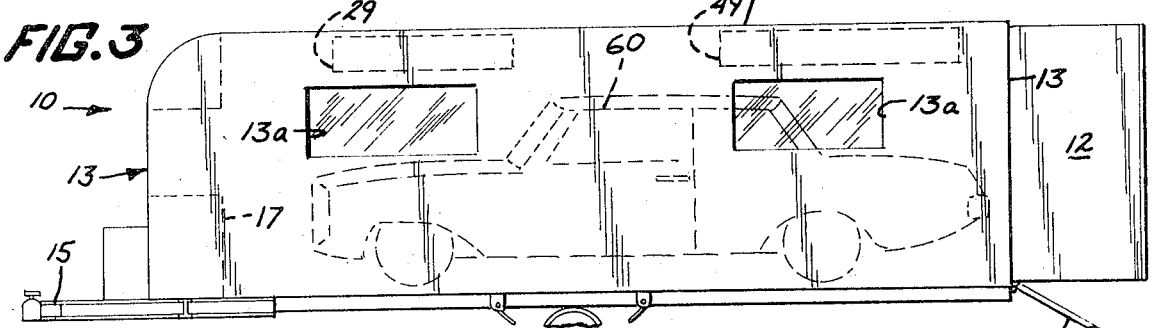
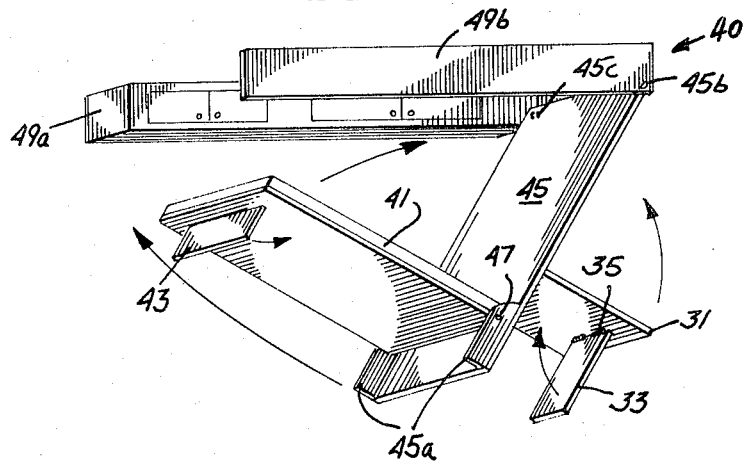

MOBILE TRAILER GARAGE WITH CONVERTIBLE FURNISHINGS

FIELD OF THE INVENTION

This invention relates to trailers such as mobile trailers containing convertible furnishings. An aspect of this invention relates to a mobile trailer garage or mobile storage room which can be converted to a house trailer, camper, or the like when it is not used as a mobile or stationary garage or storage area.

A further aspect of this invention relates to a trailer type mobile storage area or garage containing both fixed furnishings and convertible or folding furnishings, at least some of the folding furnishings being storable up against the ceiling of the mobile garage. Still another aspect of this invention relates to an arrangement of convertible or folding furnishings for a mobile trailer garage or storage room wherein the unfolded or utility positions of the furnishings divide the space within the trailer into a plurality of living or utility areas suitable for a mobile home, sport camper, or the like.

DESCRIPTION OF THE PRIOR ART

It is generally known that boat or vehicle trailers, horse trailers, and the like can be provided with convertible or foldable furnishings (as well as fixed furnishings, if desired) so that the interior of the trailer can be used both for storage of large objects and for living quarters. For example, campers or sport trailers have been designed so as to permit the storage of a boat or boat-trailer combination at times when the trailer is in transit and is not used as sleeping quarters.

The following U.S. Patents are believed to be typical examples of the published literature regarding convertible trailers: U.S. Pat. Nos. 3,574,388 (Stone), issued Apr. 13, 1971; 3,193,321 (Rose), issued July 6, 1965, 3,116,949 (Muse), issued Jan. 7, 1964; and 2,942,744 (Hall), issued June 28, 1960. See also U.S. Pat. Nos. 2,847,136 (Neff), 3,179,462 (Hagen), 3,448,875 (Robinson), and 3,563,596 (Davis).

One of the most difficult problems to be solved in designing a suitable convertible mobile trailer is related to the efficient utilization of the rather limited space available. The statutes and ordinances governing the width of loads transportable on streets an highways generally take into account modern safety requirements and traffic conditions. Accordingly, loads wider than 8 feet normaly require special authorization from the proper authorities. Loads wider than 12 feet typically require special precautions as well as special authorization. Limits are also placed on the combined length of a trailer and the vehicle pulling it, e.g., 60 feet. Any practical mobile unit must be designed within these limits. The space within the trailer is therefore at a premium, and inefficiently designed furnishings, convertible or otherwise, will seriously detract from the utility of the trailer.

SUMMARY OF THE INVENTION

Briefly, this invention involves providing a multiple-use convertible mobile trailer garage or storage trailer including convertible or folding furnishings which are storable under the ceiling of the interior of the trailer. Included among the convertible furnishings is a bed-table combination. In its unfolded or utility position, a generally rectangular support member extends from the floor of the trailer to a pivotal mounting at or near the ceiling. The lower half of this support member serves as a headboard for a folding bed and also serves as a room divider for partitioning off a sleeping area from, for example, a dining or kitchen area. The head of the folding bed is attached to one face of this support member and a folding table top is preferably attached to the opposite face. The entire bed-table combination can fold up substantially flat against the ceiling of the trailer in a generally horizontally extending position. A particularly efficient arrangement for the bed-table combination is to pivotally mount one end of this member so as to permit arcurate movement of the opposite end about a rotational axis generally transverse to the longitudinal axis of the trailer. It is also preferred to include a second folding bed comprising elements moveable in a similar manner but about a rotational axis disposed along the top of a side wall of the trailer. Fixed furnishings, folding benches, and the like can also be included in the interior of the trailer.

A multiple-use trailer of this invention, which can serve as a mobile trailer garage or storage room (or stationary garage or storage area, if desired) can be readily converted to a house trailer, camper, spare room, office, workshop, or the like.

BRIEF DESCRIPTION OF THE DRAWING

FIG. 1 is a plane view of a convertible trailer of this invention with parts broken away to show the arrangement of convertible furnishing therein in the unfolded (utility) position;

FIG. 2 is a longitudinal vertical cross sectional view taken generally along line 2—2 of FIG. 1;

FIG. 3 is a side elevational view of a convertible trailer of this invention with the position of the convertible furnishings in the folded (stored) position and the position of a vehicle stored within the trailer shown in phantom; and FIG. 4 is a perspective view of a convertible bedtable furnishing removed from the convertible trailer and rotated 180° about the vertical axis thereof, showing the folding operation of the bed-table in greater detail.

In the description of the Drawing which follows, like numerals denote like elements of the convertible trailer in the various views of the Drawing.

DETAILED DESCRIPTION OF THE DRAWING

It will be clear from the following description of the Drawing that a convertible trailer of this invention has many uses and is particularly useful as a mobile trailer garage or storage room. The garage or storage space is provided with folding furnishings stored, for the most part, under the garage or storage room ceiling. The folding furnishings are intended to provide conversion of the space inside the trailer into a plurality of living space areas, e.g., a kitchen area, sleeping area, and a dining or study area.

Referring to FIG. 1, the convertible trailer as a whole is designated generally at 10 and comprises a conventional outer shell 13, including roof 14, windows 13a, and a side door 13b (FIG. 2); a conventional hitch tongue 15; a rear entry system including a tailgate ramp means 11 and a pair of rear doors 12; substantially fixed furnishings such as a stove 17, sink 18, and cabinet 19; and folding or convertible beds 21 and 41 and table 31, which fold up flat against the ceiling of the trailer under roof 14, and benches 51 which can fold up flat against the walls, to make room for the vehicle garage or storage area, workshop, etc. As shown in FIG. 3, there is sufficient room to store a motor vehicle 60 when the beds and table are in their folded position.

From FIG. 2, it can be seen that the largest folding furnishings comprise a folding bed 21 and a folding bed-table combination designated generally at 40 in FIG. 4. Folding beds 21 and 41 are pivotally attached at the head of each bed to generally rectangular planar support members, 25 and 45 respectively. In the unfolded or utility position, the lower half of support members 25 and 45 can serve as headboards for beds 21 and 41. Support member 45 can also serve as a room divider or partition for partitioning off the sleeping area containing bed 41 from the dining or study area containing tabletop 31. As will be most clearly seen from FIG. 2, tabletop 31 is supported by a folding broad base table leg or support 33 when in the unfolded, utility position. A preferred pivotal mounting device for table support 33 is a hinge 35 shown in FIGS. 2 and 3. The preferred pivotal mountings for support members 25 and 45 comprise journal bearings 25a and 25b (for member 25) and bearings 45b and 45c (for member 45). The spindles rotatable in these journal bearings are integral with members 25 and 45, but any suitable equivalent means can be provided to permit arcurate movement of members 25 and 45 about a rotational axis defined by the journal bearings.

Although member 25 in the unfolded position is in closely spaced relation to a side wall defined by shell 13 of trailer 10, (the rotational axis defined by journal bearings 25a and 25b being parallel to the longitudinal axis of trailer 10 and close to the top of the side wall), temporary partitions such as curtains or shades (not shown) can be hung from the housing 29 which contains folding bed 21 and member 25 when the bed is in the stored position.

Therefore, as will be apparent from FIGS. 1 and 2 of the Drawing, a convertible mobile trailer 10 of this invention can be divided up into a plurality of living or utility spaces when the folding furnishings are in the unfolded position. Folding bed 21 helps to define a kitchen area containing stove 17, sink 18, and cabinets 19 and a short, narrow hallway leading from this kitchen area into a dining or study area containing folding tabletop 31. One face of member 45 defines a wall of this dining or study area, while the other face defines a wall of a second bedroom area separate from bed 21. As in the case of housing 29, temporary partitions can be suspended from housing 49 for bed 41, regardless of whether bed 41 is in the folded or unfolded position.

Folding bed 41 is a pallet-like member journalled at 47 in a pair of bed frame members 45a integral with the lower portion of member 45. However, a hinged mounted or any suitable pivotal mounting can be substituted for the journalled mounting. No mattress is shown in the drawing, but any suitable inner spring or foam rubber mattress can be used. Bed 21 is also a pallet-like member pivotally mounted in the same manner as bed 41. Beds 21 and 41 are supported near the foot of each bed by folding widebase foot supports 23 and 43, respectively.

The housing 49 for bed-table combination 40 can have two, three, or four vertical sides and preferably comprises at least one short vertical partition 49b attached to the ceiling of trailer 10 and a row of ceiling cabinets 49a which defines a second short vertical partition and also provides additional storage space. If desired, a track or a set of hooks or eyes can be attached to partition 49b for curtains, shades, or the like to screen off a bedroom area containing bed 41.

Although the pivotal mounting of member 45 along a rotational axis transverse to longitudinal axis of the trailer and the pivotal mounting of member 25 along a rotational axis parallel to this longitudinal axis comprise a particularly efficient arrangement of folding beds, other arrangements can be provided. For example, member 25 could move about a transverse axis, particularly if the trailer contained no kitchen area.

The particular design of benches 51 is not essential to the invention, though it is preferred to provide at least one folding bench in closely spaced relation to tabletop 31. One or both of benches 51 can be made much narrower than shown in the Drawing to facilitate use of the dining or study area. For example, the benches can be made small enough to be folded up or down against a side wall of the trailer without disturbing the position of tabletop 31.

In the folded (stored) position shown in FIG. 3, the bed-table combination (member 45, table 31, bed 41, etc.) is neatly stred in housing 49, while member 25 and bed 21 (including foot support 23) are neatly stored in housing 29. With rear doors 12 open and tailgate ramp 11 down, a wheeled vehicle 60 or other large object can be moved into the interior of the trailer and stored or transported therein.

The operation of the convertible furnishings of this invention is best illustrated by the collapsing and folding of the bed-table combination generally designated 40 and illustrated in detail in FIG. 4.

Table 31 can be grasped at its free end and raised to its folded position against support member 45. Broad base table leg 33 automatically assumes a folded position against the raised vertical undersurface of table 31. Table 31 is then preferably locked in this folded position by a suitable clamp or latch means (not shown), and bed 41 is then ready for folding. Bed 41 can be folded by lifting it from the foot or by grasping folding foot support 43. With bed 41 folded into its vertical position on the opposite side of headboard 45 from folded table 31 member 45 is then ready to be raised to the ceiling and locked into position by a suitable latch or clamp means (not shown).

As will be apparent from the foregoing description, various modifications and uses of this invention are within the skill of the art. As pointed out previously, the convertible mobile trailer garage or storage room can be used as a mobile home, camper, spare room, office space, or workshop. Properly stationed or provided with a simple foundation, it can serve as a stationary garage, on-site contractor's office, modular home, etc. Conventional heating units, battery power circuitry, liquid petroleum gas tanks, water tanks, etc. can be installed in the usual manner. The vehicle stored in the mobile trailer garage or storage room can be a boat or other motorized equipment, a motorcycle, automobile, or other vehicle. A driver's cab or tractor wih a power plant can be included in the trailer design if desired. The interior of the mobile trailer garage or storage room can be made comfortable and still be provided with floor drains, oil-and-grease-resistant floor coverings or splash boards or panelling, and the like.

This application contains descriptive material disclosed in the file of Disclosure Document No. 013477, filed Sept. 18, 1972.

What is claimed is:

1. In a mobile trailer having an outer shell defining therewithin a space enclosed by a ceiling, side walls, and a floor,
   a bed-table combination storable under and suspended from said ceiling and convertible from a folded storage position under said ceiling to an unfolded utility position, said bed-table combination comprising:
   a. a bed-table suspending means attached to said ceiling, said suspending means including pivotal mounting means for permitting said bed-table combination to move from either of said positions to the other position,
   b. a generally rectangular planar support member having a first end, pivotally attached to said suspending means, and a second, moveable end opposite to said first end; said first end being relatively stationary compared to said second moveable end; one face and the sides adjacent said moveable end of said support member defining a headboard for the bed of said bed-table combination,
   c. a generally flat, planar folding bed means pivotally attached at its head end to said face of said support member,
   d. a table top member pivotally attached to the face opposite the face to which said folding bed means is attached.

2. Mobile trailer according to claim 1 wherein said suspending means is arranged to pivotally suspend said first end of said planar support member on a rotational axis transverse to the longitudinal axis of the trailer and includes means to permit said planar support member to move arcurately from a vertically extending position, with said second, moveable end resting on the floor of the trailer, to a horizontally extending position in the plane of said rotational axis.

3. Mobile trailer according to claim 2 further comprising a second storable bed comprising:
   a. a second suspending means attached to said ceiling spaced apart longitudinally, with respect to the longitudinal axis of the trailer, from said bed-table suspending means, said second suspending means including pivotal mounting means for permitting said storable bed to move to and from a storage position under the ceiling of said trailer,
   b. a generally rectangular planar support member having a first end pivotally attached to said second suspending means and a second, moveable end opposite said first end, said first end being arranged to be relatively stationary compared to said second end when said storable bed is being moved to and from said storage position, one face and the sides adjacent said moveable end of said support member defining a headboard for said second storable bed, and
   c. a generally flat, planar folding bed means pivotally attached at one end thereof to said face of said support member.

4. Mobile trailer according to claim 3 wherein the said second suspending means provides a rotational axis for said second storable bed which is generally parallel to the longitudinal axis of the trailer and is generally adjacent a said side wall of said trailer.

5. Mobile trailer according to claim 1 wherein:
   a. said folding bed means includes a foldable foot support means pivotally mounted in closely spaced relation to the foot end of said folding bed means when unfolded,
   b. said table top member includes a foldable support member pivotally mounted thereon.

6. Mobile trailer according to claim 2 wherein said ceiling includes a housing means for the bed-table combination when said bed-table combination is in the stored position, said housing means extending horizontally along the longitudinal axis of said trailer from the said rotational axis.

7. Mobile trailer according to claim 1 wherein said pivotal mounting means comprises a pair of journal bearings and said generally rectangular planar support member includes a pair of spindles rotatably engaged in said journal bearings.

8. Mobile trailer according to claim 1 wherein said mobile trailer further comprises:
   a. fixed furnishings including cabinets and kitchen appliances, and
   b. a tailgate ramp means for loading a vehicle into the interior of the trailer.

9. Mobile trailer according to claim 1 wherein said trailer further comprises at least one folding bench means pivotally mounted on a side wall enclosing said living space, said folding bench being mounted in closely spaced relation to said table top member when said bed-table combination is in said unfolded utility position.

10. In a mobile trailer garage convertible from a garage for wheeled vehicles to a trailer containing living quarters, said trailer including convertible furnishings in the interior thereof, at least some of which furnishings are storable under the ceiling of the interior of the trailer, the improvement which comprises: at least one generally rectangular planar support means which provides a partition for dividing the interior of the trailer into at least two utility areas, and also provides a headboard for a storable bed, said bed comprising a generally rectangular base member for use as a sleeping surface, one side of said base member being pivotally attached to said support means; said support means extending substantially across said trailer interior, one end of said support means being pivotally mounted to the ceiling of the trailer for arcuate movement of the opposite end from a generally horizontal extending position, in which said support means and said bed base member are in closely spaced relation to the ceiling of the trailer, to a generally vertical position extending from the floor to the ceiling of the trailer.

* * * * *